United States Patent
Reisenbauer

(10) Patent No.: US 12,483,660 B2
(45) Date of Patent: Nov. 25, 2025

(54) METHOD AND SYSTEM FOR ELIMINATING ECHO IN THE REPRODUCTION OF RADIO SIGNALS TRANSMITTED VIA A RADIO CHANNEL

(71) Applicant: Frequentis AG, Vienna (AT)

(72) Inventor: Andreas Reisenbauer, Vienna (AT)

(73) Assignee: Frequentis AG, Vienna (AT)

( * ) Notice: Subject to any disclaimer, the term of this patent is extended or adjusted under 35 U.S.C. 154(b) by 365 days.

(21) Appl. No.: 18/084,760

(22) Filed: Dec. 20, 2022

(65) Prior Publication Data
US 2023/0199121 A1    Jun. 22, 2023

(30) Foreign Application Priority Data
Dec. 22, 2021    (AT) ............... A 51033/2021

(51) Int. Cl.
*H04W 4/40*      (2018.01)
*H04M 9/00*      (2006.01)

(52) U.S. Cl.
CPC ................... *H04M 9/00* (2013.01)

(58) Field of Classification Search
CPC .......... H04M 9/00; H04L 7/007; H04B 7/015; H04B 1/7107; H04B 1/711
USPC ....................................... 455/422.1
See application file for complete search history.

(56) References Cited

U.S. PATENT DOCUMENTS

| | | | |
|---|---|---|---|
| 10,972,421 B2 | 4/2021 | Aster | |
| 2004/0083301 A1* | 4/2004 | Murase | H04N 21/23805 |
| | | | 348/E7.071 |
| 2005/0096899 A1 | 5/2005 | Padhi et al. | |
| 2010/0201824 A1* | 8/2010 | Wei | H04N 21/6377 |
| | | | 348/180 |
| 2013/0246059 A1* | 9/2013 | Kechichian | G10L 21/0208 |
| | | | 704/226 |
| 2019/0124206 A1* | 4/2019 | Qiao | H04M 9/08 |
| 2020/0066295 A1* | 2/2020 | Karimian-Azari | |
| | | | G10L 21/0264 |

FOREIGN PATENT DOCUMENTS

| | | | |
|---|---|---|---|
| AT | 522205 A1 | 9/2020 | |
| DE | 102005041653 A1 | 3/2007 | |

* cited by examiner

*Primary Examiner* — Tanmay K Shah
(74) *Attorney, Agent, or Firm* — Laurence A. Greenberg; Werner H. Stemer; Ralph E. Locher

(57) ABSTRACT

A method and system eliminate echoes in the reproduction of radio signals transmitted via a radio channel. A radio signal transmitted by a transmitter is received by at least a first base station as a first audio signal and by at least a second base station as a second audio signal. The received audio signals are transmitted via an IP network to a control station for reproduction. The first and second audio signals arrive in the control station at different times or with a time shift and undergo a similarity analysis before their reproduction in the control station in order to reproduce the radio signal contained in both audio signals without echo if a similarity is established between the first audio signal and the second audio signal.

8 Claims, 3 Drawing Sheets

METHOD AND SYSTEM FOR ELIMINATING ECHO IN THE REPRODUCTION OF RADIO SIGNALS TRANSMITTED VIA A RADIO CHANNEL

CROSS-REFERENCE TO RELATED APPLICATION

This application claims the priority, under 35 U.S.C. § 119, of Austrian Patent Application AT A51033/2021, filed Dec. 22, 2021; the prior application is herewith incorporated by reference in its entirety.

FIELD AND BACKGROUND OF THE INVENTION

The present invention relates to a method for eliminating echo in the reproduction of radio signals which have been transmitted via a radio channel and have been recorded by at least a first and second base station.

The present invention further relates to a system to carry out the method.

Particularly in the case of communication in very high-frequency marine radio, a plurality of base stations is used along the coastline to receive the radio signals transmitted from ships in order to ensure maximum coverage of the marine area that is to be monitored. The base stations are positioned along the coastline in such a way that a transmitter of a radio signal is always located in the receive range of at least one base station. If a transmitter located in the marine area to be monitored is located simultaneously in the receive range of a plurality of base stations, this can result in the radio signal being received by the plurality of base stations, wherein all audio signals received by the base stations are forwarded essentially simultaneously to a control station.

The digital transmission of received audio signals from a base station to a control station via an IP network has proven successful due to the higher transmission quality. In contrast to signals transmitted in analog form which, in the event of interference, are transmitted either not at all, only partially or with poor quality, digital signals can always be transmitted with high quality, although the transmission can be affected by a time delay due to latency or interference.

Particularly if the audio signals received by the base stations are transmitted to a control station via an IP network, the transit time of the data packets via the IP network is dependent on various factors (such as the connection quality) and can vary depending on the location of the base station. If a radio signal is then received by a plurality of base stations and the corresponding audio signals are transmitted essentially simultaneously from said base stations to the control station via the IP network, this can result in different transit times of the audio signals via the IP network. The two audio signals which contain the same radio signal then arrive at different times or with a time delay in relation to one another for reproduction in the control station and can thus result in an interfering superimposition or echo in the reproduction.

Methods for avoiding superimposition in the reproduction radiotelephony signals, for example, are known from the prior art. Published, non-prosecuted Austrian patent application AT 522 205 A1, corresponding to U.S. Pat. No. 10,972,421, for example, thus discloses a method in which, if two radiotelephony messages are received simultaneously, one message is temporarily stored and is transmitted following successful reproduction of the first message. However, methods of this type are only suitable for the superimposition-free reproduction of different or independent radiotelephony signals. If audio signals are superimposed by one and the same radio signal, this would result in multiple repetition of the reproduction, which is, however, unwanted and adversely affects the efficiency or reliability of the method.

SUMMARY OF THE INVENTION

The object of the present invention is therefore to improve a method of the aforementioned type in such a way that an echo in the reproduction of radio signals transmitted via a radio channel can be reliably reduced or avoided even if the radio signal is received by a plurality of base stations and the received audio signals are transmitted to a control station for reproduction and arrive there at different times.

The invention achieves the defined object by a method for eliminating echo in the reproduction of radio signals transmitted via a radio channel, in which method a radio signal transmitted by a transmitter is received by at least a first base station as a first audio signal and by at least a second base station as a second audio signal, the received audio signals are transmitted via an IP network to a control station for reproduction. The first audio signal and the second audio signal arrive in the control station at different times or with a time shift and undergo a similarity analysis before their reproduction in the control station.

In the method according to the invention for eliminating echo in the reproduction of radio signals transmitted via a radio channel, a radio signal transmitted by a transmitter is received simultaneously by a plurality of base stations. The radio signal is received and recorded by at least a first base station as a first audio signal and by at least a second base station as a second audio signal. The recorded first audio signal and the recorded second audio signal are then transmitted independently from one another in each case via an IP network to a control station in which the radio signal is intended to be reproduced. Since the transmission of the audio signals to the control station via the IP network(s) can be subjected to different latency times or signal transit times, the first and second audio signal can arrive in the control station at different times or the two audio signals can have a time shift in relation to one another before the reproduction in the control station. In order to avoid a time-delayed superimposition of the first and second audio signal, a similarity analysis of the audio signals is first performed or at least the first and second audio signal undergo a similarity analysis before the reproduction of the received audio signals. If a similarity between the first and second audio signal is identified in the similarity analysis, the audio signals can be reproduced in such a way that the radio signal contained in the audio signals is reproduced without echo.

It should be noted in general that the present invention is described in this description by way of example on the basis of two base stations, in particular a first and a second base station which receive the radio signal essentially simultaneously. However, the description of the invention on the basis of two base stations is not to be understood as limiting. The invention is also equally suitable for methods in which a radio signal is received simultaneously by three or more base stations, wherein the radio signal is received by a first, second, third, etc., base station as a first, second, third, etc., audio signal, and the audio signals are transmitted to a control station for reproduction. In this case, the description given here also applies accordingly to the further base stations in addition to the at least first and second base stations and to further audio signals in addition to the first and second audio signal, which are received and recorded in each case by the further base stations.

By means of the similarity analysis according to the invention of the audio signals arriving at the control station, it is possible to reliably establish whether the audio signals contain essentially the same radio signal, so that the audio signals can be reproduced accordingly in the control station without superimpositions or without echo.

The similarity analysis is preferably configured in such a way that a similarity is established only if the audio signals originate from the same radio signal, i.e. they contain essentially the same radio signal, and differ only in terms of system-induced interference, superimpositions, noise, etc.

It is assumed according to the invention that the audio signals received in parallel by the different base stations originate from radio signals which have been transmitted on the same radio channel. According to one design variant of the invention, information relating to the radio channel on which the radio signal has been transmitted or received can also be transmitted in addition to the radio signal itself. If, for example, two audio signals originating from different radio channels are compared in the similarity analysis, it can normally be assumed these audio signals are different, i.e. dissimilar.

However, according to a further design variant, radio signals from different channels can similarly be received in parallel as audio signals and can be compared in the similarity analysis. This can be advantageous, particularly in cases where a radio signal is transmitted simultaneously via a plurality of radio channels. It can thereby be ensured in such a case also that the radio signal can be responded to without a time delay.

According to one advantageous design variant of the method, if a similarity is established between the first and second audio signal, only the first audio signal and not the second audio signal, or only the second audio signal and not the first audio signal is reproduced. Through this selective reproduction of only one of the similar audio signals which contain essentially the same radio signal, an echo-free reproduction can be performed using a particularly simple technical method.

According to a further advantageous design variant, a quality value can be calculated from the first and second audio signal, wherein only the audio signal having the higher quality value is reproduced. By outputting the audio signal with the higher quality value, it can always be ensured that only the audio signal having the higher probability of interference-free reproduction is output. This can prove advantageous, particularly in the reception and reproduction of emergency call radio signals, since a higher reproduction quality or speech quality reduces the need for additional queries or repeated communication and therefore reduces the time to respond to the emergency call radio signal. Alternatively, it can also be provided that the audio signal having the higher quality value is reproduced first and the audio signal having the lower quality value is reproduced at a later time, e.g. for the purpose of content verification, or is stored for such a purpose.

The quality value can represent, in particular, the reproduction quality or sound quality of the audio signal, wherein, in particular, interference, superimpositions, transmission errors, etc., can result in a lower or poorer quality value. The sound quality can represent e.g. an evaluation of the precision, fidelity or comprehensibility of the audio signal when reproduced via an electronic device.

A multiplicity of methods which can determine or estimate the reproduction quality or sound quality of the audio signal are suitable for determining the quality value. The quality value can thus be obtained, for example, by determining the noise component of the audio signal or through comparison with a reference signal.

According to a further design variant, if only one audio signal is reproduced, the other audio signal can be stored temporarily for subsequent reproduction so that it can similarly be reproduced separately if necessary. This can be advantageous particularly if the reproduced audio signal contains interference which does not enable a complete and uninterrupted reproduction of the radio signal. On the other hand, the other audio signal which is not reproduced can also be stored for backup purposes or for the similarity analysis evaluation. Thus, according to one design variant, following the reproduction of one audio signal, the other audio signal which is not reproduced can similarly be reproduced in order to confirm the similarity of the audio signals and, in the event of a subsequently established dissimilarity, to enable a separate reproduction.

According to a further advantageous design variant, if a similarity is established between the first and second audio signal, the first and second audio signal can be output in superimposed form. Through the superimposed output of the audio signals, it can always be ensured that the entire information contained in both audio signals is reproduced, e.g. even if information is superimposed by interference in the first audio signal and is contained in the second audio signal only, or vice versa. Audio signals recorded in parallel can thus be reliably reproduced using a simple technical method. In particular for receiving emergency calls, the method according to the invention can be characterized in that a faster response to the radio signal is enabled with a reduced need for queries.

In particular before the superimposed output of the first and second audio signal, any time delay of the radio signal contained in the audio signals can be removed or reduced so that the superimposed audio signals can be reproduced in a synchronized manner and the reproduction takes place without echo.

According to a further design variant of the invention, a time-dependent cross-correlation between the first and second audio signal can be calculated in the similarity analysis and a similarity is established if a cross-correlation peak occurs with time shifts between 0 ms and 1000 ms, in particular between 2 ms and 500 ms, particularly preferably between 5 ms and 200 ms. By calculating a time-dependent cross-correlation in the similarity analysis, a similarity between the first and second audio signals can be identified using a technically simple method. The similarity analysis can further be performed efficiently with little computing effort and the latency times or delays in the reproduction of the audio signals can thus be reduced and the overall response times of the entire method can be minimized.

The discrete time-dependent cross-correlation function $R_{xy}[\tau]$ of two time-dependent discrete signals $x[\tau]$ and $y[\tau]$ is defined according to formula (1):

$$R_{xy}[\tau] = (x * y)[\tau] = \sum_{t=-\infty}^{\infty} x^*[t] y[t + \tau], \quad (1)$$

where $\tau$ indicates the time shift between the signal $x[\tau]$ and the signal $y[\tau]$. As described above, the cross-correlation function $R_{xy}[\tau]$ is preferably calculated for all time shifts $r$ between 0 ms and 1000 ms, in particular between 2 ms and 500 ms, particularly preferably between 5 ms and 200 ms. In a further step, peaks are then identified in the cross-correlation function $R_{xy}[\tau]$ and are assigned to the corresponding time shift values $\tau_p$, wherein the time shift value $\tau_p$ at which a peak is identified in the cross-correlation function $R_{xy}[\tau]$ indicates the time shift by which the signals $x[\tau]$ and $y[\tau]$ are shifted in relation to one another. In the method according to the invention, the audio signals received by the base stations are used as the signals $x[\tau]$ and $y[\tau]$.

According to a further design variant of the method, envelopes of the first and second audio signal can be used in each case to calculate the cross-correlation. The computing effort of the method can be further reduced through the use of envelopes. The envelopes can be obtained using a simple technical method by applying a low-pass filter and/or a Hilbert transform to the audio signals. A reliable method offering a fast response can thus be obtained. In this case, the envelopes of the audio signals are used as the signals $x[\tau]$ and $y[\tau]$ to calculate the cross-correlation function $R_{xy}[\tau]$.

According to a further design variant of the method, it can be established in the similarity analysis whether the receive areas of the first and second base station overlap one another. In particular, the audio signals which are to be compared with one another are selected on the basis of overlapping receive areas, wherein it is assumed that no similarity exists between audio signals which were recorded essentially simultaneously by different base stations, but the base stations are assigned to non-overlapping receive areas. In this way, a preselection can be made in the similarity analysis for potentially similar audio signals, and the efficiency of the method can thus be significantly increased and the computing effort of the similarity analysis reduced.

The underlying object of the invention is further achieved by a system as claimed in the independent system claim. The advantages explained above apply accordingly to this system.

In particular, the system according to the invention has at least a first and a second base station. A radio signal transmitted via a radio channel can thus be received by the first base station as a first audio signal and can be received by the second base station as a second audio signal, provided that the two signals have an overlapping receive area in which the transmitter of the radio signal is located. The two base stations are connected to a control station via at least one IP network, wherein the base stations can be connected to the control station in each case via separate IP networks or via a common IP network. The control station is configured to reproduce the audio signals recorded by the base stations. The system further has an analysis unit for the similarity analysis of a first and second audio signal, wherein the analysis unit is programmed to carry out the method according to the invention.

A similarity analysis of the audio signals received by the base stations can thus be performed by the correspondingly programmed analysis unit, thereby enabling an echo-free reproduction of the audio signals in the control station.

Other features which are considered as characteristic for the invention are set forth in the appended claims.

Although the invention is illustrated and described herein as embodied in a method for eliminating echo in the reproduction of radio signals transmitted via a radio channel, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Referring now to the figures of the drawings in detail and first, particularly to FIG. 1 thereof, there is shown a method 100 according to the invention which is described below by way of example on the basis of the design variants shown in the figures. The figures similarly show a system 200 according to the invention by means of which the method 100 according to the invention can be carried out.

Figure 1:
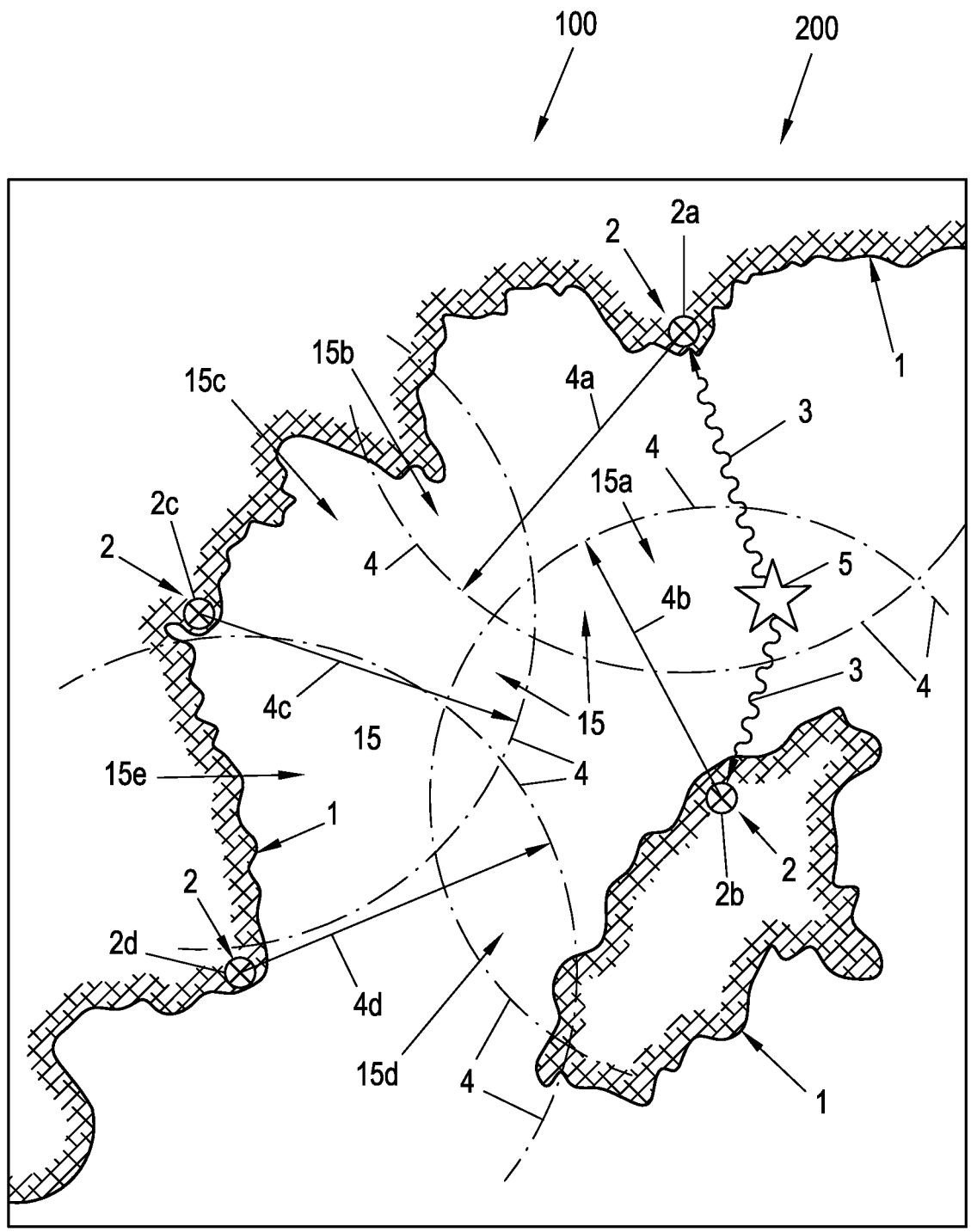
FIG. 1 is an illustration showing a system according to the invention or the method according to the invention according to a first design variant on a basis of two coastlines having a plurality of base stations for receiving radio signals.

FIG. 1 shows a schematic view of the system 200, wherein a plurality of base stations 2 are arranged along two coastlines 1 for the reception of radio signals 3. The base stations 2 in each case cover corresponding receive ranges 4, wherein the radio signals 3 transmitted by a transmitter 5, such as a ship, can be received by those base stations in whose receive range 4 the transmitter 5 is located.

As shown by way of example in FIG. 1, four base stations 2, in particular a first base station 2a, a second base station 2b, a third base station 2c and a fourth base station 2d are arranged along the coastlines 1. A first receive range 4a is assigned accordingly to the first base station 2a, a second receive range 4b to the second base station 2b, a third receive range 4c to the third base station 2c and a fourth receive range 4d to the fourth base station 2d.

The transmitter 5 is located simultaneously in the first receive range 4a of the first base station 2a and in the second receive range 4b of the second base station 2b. The radio signal 3 transmitted by the transmitter 5 is therefore received essentially at the same time by the first base station 2a as the first audio signal 6a and by the second base station 2b as the second audio signal 6b.

According to a further design variant of the invention, the transmitter 5 can similarly be located in the receive range 4 of more than two base stations 2 and the radio signal 3 can therefore also be received simultaneously by more than two base stations 2, although this is not shown in the figures. It is therefore similarly conceivable, for example, for the transmitter 5 to be located simultaneously in the receive range 4a of the first base station 2a, in the receive range 4b of the second base station 2b and in the receive range 4c of the third base station 2c. However, the invention is described below by way of example only on the basis of the situation shown in FIG. 1, but this is not to be interpreted as limiting.

The first and second audio signal 6a, 6b contain the radio signal 3 received by the first and second base station 2a, 2b and transmitted by the transmitter 5. According to one design variant, the radio signal 3 can contain a radio call, such as, for example, an emergency radio call. In one alternative design variant, the radio signal 3 can also be a morse code signal or a data signal.

Figure 2:
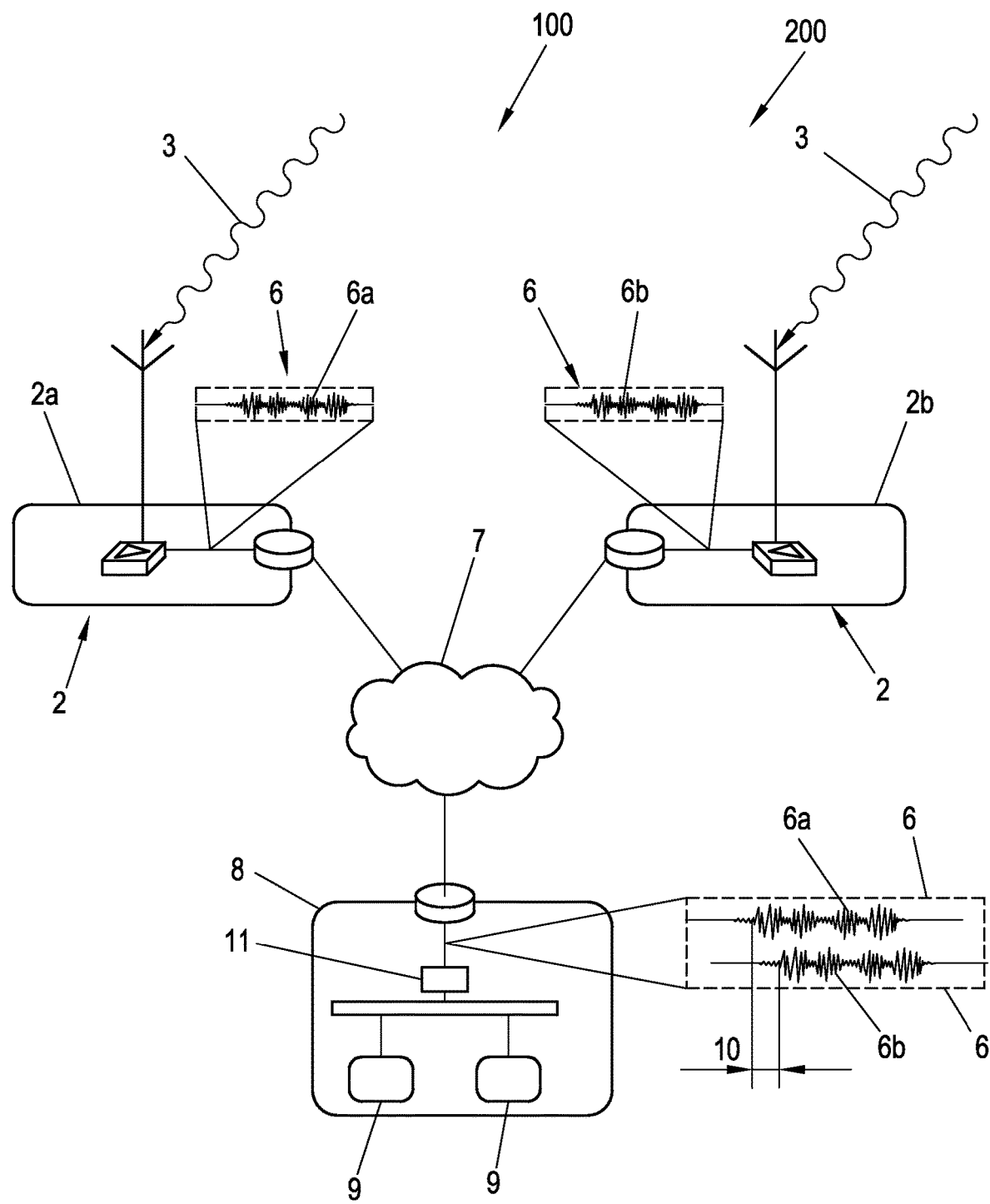
FIG. 2 is an illustration of the system according to the invention or the method according to the invention as shown in FIG. 1.

FIG. 2 further shows a schematic view of the system 200 according to the invention in which the base stations 2 are connected via an IP network 7 to a control station 8.

As shown in FIG. 2, the radio signal 3 is received in the base stations 2 and is converted into a preferably digital audio signal 6. The audio signals 6 or, in particular, the first audio signal 6a and the second audio signal 6b are then transmitted to a control station 8 for reproduction. The base stations 2 and also the control station 8 are connected to an IP network 7. The control station 8 itself can have a plurality of control station positions 9 at which the audio signals are reproduced to an operating person.

As further shown in FIG. 2, the first and second audio signal 6a, 6b arrive in the control station 8 at different times or the audio signals 6 have a time shift 10 in relation to one another. As shown by way of example in FIG. 2, the second audio signal 6b has arrived in the control station 8, time-delayed in relation to the first audio signal 6a by the time shift 10. In the case of simultaneous (unprocessed) reproduction of the first and second audio signal 6a, 6b at a control station position 9 in the control station 8, an echo is produced between the first and second audio signal 6a due to the time shift 10, 6b, said echo having a negative impact on the reproduction quality.

According to the preferred design variant of the method 100, before the reproduction in the control station 8, the audio signals 6 pass through an analysis unit 11 of the system 200 in which a similarity analysis of the incoming audio signals 6 is performed. Thus, if a similarity is established between the first and second audio signal 6a, 6b, the audio signal 6 can be reproduced at a control station position 9 in such a way that the echo is reduced or eliminated.

According to the preferred design variant of the invention, the similarity analysis which is performed in the analysis unit 11 serves to establish whether the first and second audio signal 6a, 6b contain essentially the same radio signal 3, even though they were recorded by different base stations 2. Even if the audio signals 6a, 6b originate from the same radio signal 3, they can nevertheless differ from one another in terms of contained interference, such as e.g. signal superimpositions, noise, etc. A difference of this type nevertheless leads to the conclusion that a similarity exists between the audio signals 6a, 6b.

Figures 3, 4:
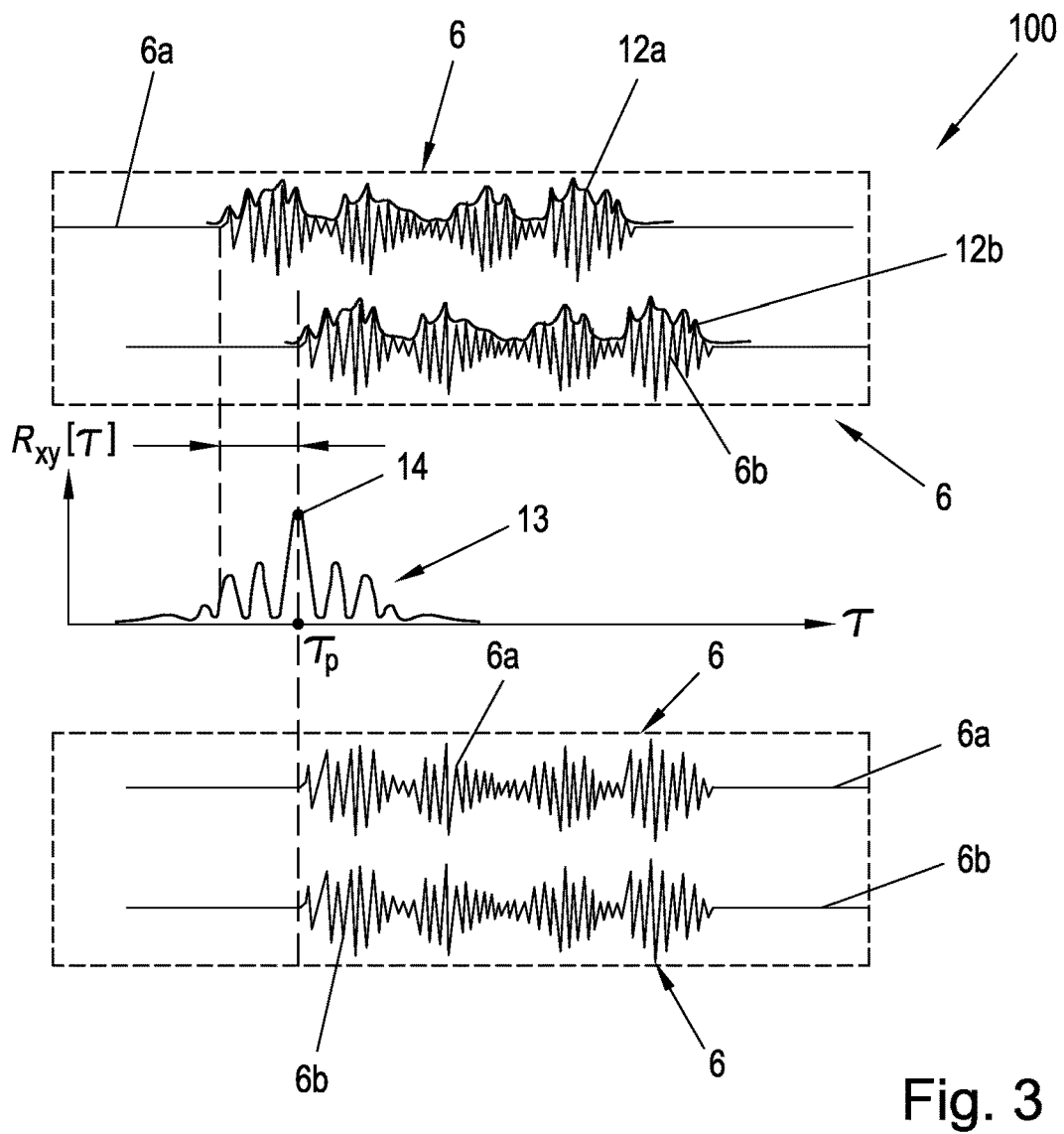
FIG. 3 is an illustration showing the audio signals received by base stations and a calculation of a correlation function therefrom using the method according to the invention as shown in FIGS. 1 and 2.
FIG. 4 is a table representing overlap areas between the receive ranges of the base stations in the system according to the invention as shown in FIG. 1.

The similarity analysis of the audio signals 6 is shown in detail with reference to FIG. 3. According to the preferred design variant, a first envelope 12a of the first audio signal 6a and a second envelope 12b of the second audio signal 6b are calculated for this purpose. According to one design variant, the envelopes can be calculated in a simple manner by applying a low-pass filter and/or a Hilbert transform to the respective audio signal 6a, 6b.

According to the preferred design variant, a time-dependent cross-correlation 13 is calculated in a further step from the envelopes 12a, 12b of the first and second audio signal 6a, 6b. The cross-correlation function $R_{xy}[\tau]$ is calculated as described above on the basis of the formula (1) from the envelope of the first audio signal 6a as a time-dependent signal $x[\tau]$ and from the envelope of the second audio signal 6b as a time-dependent signal $y[\tau]$. As shown in FIG. 3, the cross-correlation 13, with a time shift $\tau_p$ which corresponds to the time shift 10 between the first and second audio signal 6a, 6b, has a cross-correlation peak 14. The presence of the peak 14 indicates a correlation and therefore a similarity between the audio signals 6a, 6b, and also a time shift $\tau_p$ between the audio signals 6a, 6b. The cross-correlation function $R_{xy}[\tau]$ can advantageously be calculated with little computing effort, thus enabling a computer-supported similarity analysis with short response times.

In an alternative design variant, the first audio signal 6a can itself be used as the signal $x[\tau]$ and the second audio signal 6b itself as the signal $y[\tau]$ to calculate the cross-correlation function $R_{xy}[\tau]$.

According to the method 100, for example, a similarity between the audio signals 6a, 6b is established only if the cross-correlation peak occurs with time shifts ($\tau_p$) 10 between 0 ms and 1000 ms. According to one preferred design variant, the cross-correlation peak 14 must occur with time shifts 10 between 2 ms and 500 ms in order to establish the similarity. However, it may also be required that the cross-correlation peak 14 must occur with time shifts 10 between 5 ms and 200 ms.

According to a further design variant of the method 100, only one of the two audio signals 6a, 6b is reproduced in the control station 8 if a similarity between the first and second audio signal 6a, 6b is established by the analysis unit 11. A superimposition of the audio signals 6a, 6b, time-delayed by the time shift 10, can thus be avoided, as a result of which no echo occurs during the reproduction. Thus, according to one design variant, only the first audio signal 6a is reproduced, whereas the second audio signal 6b is temporarily stored and can be reproduced if necessary at a later time.

According to a further design variant of the method 100 which has, however, not been shown in detail in the figures, the radio signal 3 is recorded by more than two base stations 2 as the audio signals 6 and is forwarded to the control station 8. As described above, the radio signal 3 is received, for example, not only by the first and second base station 2a, 2b as the first and second audio signal 6a, 6b, but also by a third base station 2c as the third audio signal. The audio signals 6 are then forwarded in turn to the control station 8 via the IP network 7 and arrive there at different times. As shown in FIG. 2, the first and second audio signal 6a, 6b have a time shift 10 in relation to one another. Similarly, the first audio signal 6a and the third audio signal, and also the second audio signal 6b and the third audio signal in each case have a time shift in relation to one another, but this has not been shown in detail in the figures.

The cross-correlation function is calculated between all audio signals 6 in order to establish the similarity between the audio signals 6, and the respective time shifts between the three audio signals 6 are thus determined by identifying the corresponding cross-correlation peak.

According to the design variant described above, if a similarity is established between the first, second and third audio signal 6a, 6b, only one of the three audio signals 6 is then reproduced. The respective other two audio signals can then in turn be temporarily stored and reproduced separately later if necessary.

According to a further design variant of the method 100, a quality value of the audio signals 6 can be calculated during the similarity analysis in the analysis unit. The quality value can be a measure of the reproduction quality and/or speech quality of the respective audio signal 6, whereby the audio signal 6 which has the highest quality value can be selected in the similarity analysis for output in the control station 8. By preselecting the audio signal 6 to be output on the basis of a quality value, the signal having the objectively highest quality can be output, thus increasing the probability of an interference-free reproduction in the control station 8.

According to a further design variant of the method 100, the first and second audio signals 6a, 6b are reproduced in superimposed form if a similarity between the first and second audio signal 6a, 6b is established by the analysis unit 11. In particular, the time shift 10 between the audio signals 6 is removed for this purpose before the superimposed output of the audio signals 6a, 6b in the control station 8, so that they are reproduced synchronously with one another. The formation of an echo can be avoided and a high-quality reproduction can be enabled through the synchronously superimposed reproduction of the audio signals 6.

As shown in FIG. 3, according to one design variant of the method 100, the time shift 10 between the first and second audio signal 6a, 6b can be determined as the time shift $\tau_p$ at the position of the cross-correlation peak 14 of the cross-correlation 13 between the first and second audio signal 6a, 6b. The first audio signal 6a can be synchronized with the second audio signal 6b using a simple technical method by delaying the first audio signal 6a by the time shift 10.

According to a further design variant of the method 10, it is possible to establish in the similarity analysis in the analysis unit 11 whether the receive areas 4 of the base stations 2 overlap one another. As shown in FIG. 4, this can be done in a simple manner using a table which maps out the overlap areas 15 of the receive areas 4.

The table in FIG. 4 thus shows by way of example the overlap areas 15 of the base stations 2 according to FIG. 1. The first base station 2a accordingly has a common overlap area 15a with the base station 2b. The first base station 2a further has an overlap area 15b with the third base station 2c. Conversely, the first base station 2a has no overlap area 15 with the fourth base station 2d. The second base station 2b in turn has an overlap area 15c with the third base station 2c and an overlap area 15d with the fourth base station 2d. Finally, the third base station 2c also has an overlap area 15e with the fourth base station 2d.

If a first audio signal 6a is received by the first base station 2a and a second audio signal 6b is received by the second base station 2b, it can be established according to the table in FIG. 4 that the first base station 2a and the second base station 2b have an overlap area 15a. A similarity analysis of the first and second audio signal 6a, 6b must therefore be performed, for example by calculating the cross-correlation 13 as described above. Conversely, if a first audio signal 6a were received by the first base station 2a and a further audio signal 6 were received by the fourth base station 2d, it could already be established with reference to the table in FIG. 4 that the first and fourth base station 2a, 2d have no overlap area 15 and the audio signals 6 cannot therefore be similar, i.e. cannot contain the same radio signal 3. In this case, a calculation of the cross-correlation 13 between the audio signals 6 can be dispensed with, as a result of which the method 100 according to the invention can be significantly improved in terms of its efficiency and response time.

The invention claimed is:

1. A method for eliminating an echo in a reproduction of radio signals transmitted via a radio channel, which comprises the steps of:

receiving a radio signal, transmitted by a transmitter, by at least a first base station as a first audio signal and by at least a second base station as a second audio signal; and transmitting the first and second audio signals via an Internet protocol (IP) network to a control station for reproduction, wherein the first audio signal and the second audio signal arrive in the control station at different times or with a time shift and undergo a similarity analysis before their reproduction in the control station in order to reproduce the radio signal contained in both the first and second audio signals without echo if a similarity is established between the first audio signal and the second audio signal;

calculating a time-dependent cross-correlation between the first audio signal and the second audio signal in the similarity analysis, envelopes of the first audio signal and the second audio signal being used in each case to calculate the time-dependent-cross-correlation, and establishing the similarity if a cross-correlation peak occurs with time shifts between 0 ms and 1000 ms; and if the similarity is established between the first audio signal and the second audio signal, removing or reducing the time shifts of the radio signal contained in the audio signals so that the first audio signal and the second audio signal are reproduced in a superimposed and/or synchronized manner.

2. The method according to claim 1, wherein if the similarity is established between the first and second audio signals, only the first audio signal or only the second audio signal is reproduced.

3. The method according to claim 2, which further comprises calculating a quality value in each case from the first and second audio signals, wherein only the first audio signal or the second audio signal having a higher quality value is reproduced.

4. The method according to claim 1, which further comprises establishing in the similarity analysis whether receive areas of the first and second base stations overlap one another.

5. The method according to claim 1, wherein the cross-correlation peak occurs with the time shifts between 2 ms and 500 ms.

6. The method according to claim 1, wherein the cross-correlation peak occurs with the time shifts between 5 ms and 200 ms.

7. The method according to claim 1, wherein the envelopes are obtained by applying a low-pass filter and/or a Hilbert transform to the first and second audio signals.

8. A system, comprising:

at least a first base station and a second base station for receiving at least one radio signal transmitted via a radio channel as a first and second audio signal respectively;

at least one control station connected to said first and second base stations via at least one Internet protocol network for the reproduction of the first and second audio signals; and an analysis unit for performing a similarity analysis of the first and second audio signals, said analysis unit being programmed to carry out the method according to claim 1.

* * * * *